United States Patent [19]
Verhille et al.

[11] Patent Number: 5,539,448
[45] Date of Patent: Jul. 23, 1996

[54] VIDEO SERVER THAT ADAPTS VIDEO SIGNALS FROM MEMORY TO A FORMAT COMPATIBLE WITH A COMMUNICATION SYSTEM IN A VIDEO-ON-DEMAND NETWORK

[75] Inventors: Henri A. J. Verhille, Brecht; Daniel Deloddere, Bazel, both of Belgium

[73] Assignee: Alcatel N.V., Rijswijk, Netherlands

[21] Appl. No.: 341,434

[22] Filed: Nov. 17, 1994

[30] Foreign Application Priority Data

Nov. 17, 1993 [EP] European Pat. Off. .............. 93870217

[51] Int. Cl.$^6$ .................................................... H04N 7/10
[52] U.S. Cl. ..................................... 348/6; 348/7; 348/16
[58] Field of Search .............................. 348/6, 7, 12, 13, 348/16; 455/4.2, 5.1; 395/200, 275; 358/86; H04N 7/10, 7/14

[56] References Cited

U.S. PATENT DOCUMENTS

| | | | |
|---|---|---|---|
| 4,506,387 | 3/1985 | Walter | 455/612 |
| 4,949,187 | 8/1990 | Cohen | 358/335 |
| 5,133,079 | 7/1992 | Ballantyne et al. | 455/4.1 |
| 5,214,639 | 5/1993 | Herion | 370/60 |

FOREIGN PATENT DOCUMENTS

| | | | |
|---|---|---|---|
| 0355697 | 2/1990 | European Pat. Off. | H04N 7/173 |
| 0529864 | 3/1993 | European Pat. Off. | H04N 1/00 |
| 2248322 | 4/1992 | United Kingdom | G11C 7/00 |
| 9211713 | 7/1992 | WIPO . | |

OTHER PUBLICATIONS

M. Fortier, "A Store-And-Forward Architecture for Video-On-Demand Service", 1993, 321.

"System Architecture for a Large Scale Video On Demand Service", W. Sincoskie, *Computer Networks and ISDN Systems 22* (1991), North Holland, pp. 155–162.

"Technoloty, Distributed Control and Performance of a Multipath Self–Routing Switch", M. Henrion et al, *XIV International Switching Symposium, Yokohama*, Oct. 1992, vol. 2, pp. 2–6.

*Primary Examiner*—Safet Metjahic
*Assistant Examiner*—Nina N. West
*Attorney, Agent, or Firm*—Ware, Fressola, Van Der Sluys & Adolphson

[57] ABSTRACT

The video server (VS) is used in a video on demand network wherein video signals are transferred over a communication network (TSY) from said video server to terminals thereof. It includes video signal memories (VM), a server control means (SCM), a broadband switch (BS) having first ports (VP1/VPY) to which the memories (VM) are coupled, second ports (CL) coupled to the communication system (TSY) and a third port (CP) to which the server control means (SCM) is coupled. The server control means (SCM) control the transfer of the video signals from the memories (VM) and through the switch (BS) and the communication system (TSY) to the terminals. The broadband switch (BS) has a set of fourth ports (CP1/CPX) to which a set of system adaptor means (SYA1/SYAX) is coupled to adapt the video signals to a format which is compatible with the communication system. The server control means (SCM) performs the transfer of video signals firstly from the video memories (VM) to the system adaptor means (SYA1/SYAX) through the switch (BS) and then from the adaptor means to the terminals via the communication system (TSY). The system adaptor means include channel memories and adaptors to perform rate and format adaption of the video signals respectively. The channel memories and the adaptors can be directly and separately coupled to the broadband switch.

12 Claims, 5 Drawing Sheets

VIDEO SERVER THAT ADAPTS VIDEO SIGNALS FROM MEMORY TO A FORMAT COMPATIBLE WITH A COMMUNICATION SYSTEM IN A VIDEO-ON-DEMAND NETWORK

TECHNICAL FIELD

The present invention concerns a video server for use in a video on demand network wherein video signals are transferred over a communication system or network from the video server to terminals of the communication network.

BACKGROUND OF THE INVENTION

Such a video server including video signal memories, a server control means, a broadband switch having first ports to which the memories are coupled, having second ports coupled to the communication network and having a third port to which the server control means is coupled for controlling the transfer of the video signals from the memories and through the switch and communication network to the terminals is known from the article "A system architecture for a large scale video on demand service" by W Sincoskie, Computer Networks and ISDN Systems 22, 1991, pp. 155–162. Therein the video memories comprise the "library", "copier memories" and "stop/start buffers". Although not described in the article, it is clear that for such a system to operate correctly, adaptor means have to be provided in order to adapt the video signals stored in the memories to a format compatible with the communication system and to provide them at a real time rate as needed for the terminals.

Indeed, the server has to provide video signals in real time and in a broadband format, e.g. an Asynchronous Transfer Mode (ATM) or a Synchronous Digital Hierarchy (SDH) or a Synchronous Optical Network (SONET) or a SONET format, although the video signals are stored in the video memories in a way which is independent from this broadband format and read therefrom at speeds that are higher than real time.

As a result of the described architecture these adaptor means have to be located at the outputs of the above memories and consequently their number has to be proportional to the number of video memories, and thus also of the number of available video signals, and this irrespective of the demand, i.e. of the number of adaptor means already in use.

In other words, when calling the resources, e.g. the adaptor means, needed to supply the specific video signals to a terminal, video channels, it is clear that the known video server has to allocate a number of video channels proportional to the number of video signals and this irrespective of the demand for these video signals. Normally, the number of video signals available can be much larger than the number of requested video signals or channel signals which may be supplied simultaneously. Hence it is clear that in the known server an excess number of video channels is allocated, which results in a waste of resources. However each of the video channels is needed to cater therefore the probability that an associated video signal, i.e. a video signal stored in the video memory corresponding to the video channel signal, is requested.

In the above, the drawbacks of the known server are related to resources. These resources can comprise hardware as well as bandwidth. Indeed, a specific number of channels requires the provision of e.g. a SONET link or other trunk line which has a specific bandwidth capability needed to be able to supply these channels. As a result, an excess of bandwidth is needed to provide the excess of channels.

DISCLOSURE OF INVENTION

An object of the present invention is therefore to provide a video server of the above known type but in which the amount of needed resources is determined by the number of video signals actually being supplied, rather then by the number of video signals stored in the video memories.

This object is achieved by virtue of the fact that the broadband switch has a set of fourth ports to which a set of system adaptor means is coupled to adapt the video signals to a format which is compatible with the communication network, and that the server control means performs the transfer of video signals firstly from the video memories to the system adaptor means through the broadband switch and then from the adaptor means to the terminals via said communication network.

The invention is based on the insight that waste of hardware and bandwidth as described above may be avoided by providing a set of system adaptor means to which a video signal can be routed via the broadband switch for conversion to a format and a rate used in the communication system. As a result, each adaptor means can be used for conversion of video signals coming from different video memories.

In this way the number of channels allocated by the video server can be dimensioned as a function of the demand for video signals, thus reducing the amount of system adaptor hardware as well as the amount of bandwidth needed, the peak demand for video signals being usually substantially lower than the number of available video signals in the video memories. A further advantage of the invention is that in so doing, the video server may be more flexibly adapted to its specific use, because availability and demand of video signals are effectively decoupled such that providing more video signals for the same amount of users does not entail a disproportionate increase in hardware while servicing more users with a same amount of signals can be appropriately handled by proportionately adding system adaptor means to the set.

A further characteristic feature of the present invention is that switch adaptor means are coupled between outputs of the video memories and corresponding ones of the first ports and are adapted to convert the video signals to a format which is compatible with the broadband switch.

Such switch adaptor means are needed to route video signals retrieved from the video memories dynamically to the ports connected to the system adaptor means. Without being able to perform such a dynamic routing it would be impossible to couple the set of system adaptor means to the broadband switch and to route the video signals to any one of the system adaptor means of the set. However, these switch adaptor means are less complex than the hardware to be incorporated in the system adaptor means to provide the channel signals. Indeed, no data rate conversion has to be performed by the broadband switch, and by an appropriate choice of the latter switch, format conversion can be kept minimal since it has only to provide for routing information to enable the routing of the video signals to the system adaptor means.

In this respect, important features of the present invention are that the switch is of a multi-path self-routing type, and that the switch adaptor means are adapted to perform said conversion of said video signals on the fly.

Such a multi-path self-routing switch, is for instance described in the article "Technology, distributed control and performance of a multipath self-routing switch", by M. A. Henrion et al., International Switching Symposium, October 1992, Yokohama, Vol. 2, pp. 2–6, and is particularly well suited for use in the present video server as the switch format used by it carries video signal parts which are encapsulated in separate cells to which a self-routing tag is appended and as it also allows these video signals to be switched at any video signal transfer rate without previous connection set-up procedures. Both of these characteristics obviously lead to a simplification of the switch adaptor means. Indeed the only conversion the latter means have to do is to encapsulate the video signals in cells and add a routing tag thereto.

A characteristic feature of the present invention is that each of the system adaptor means includes a channel memory module able to store the video signals as supplied by the broadband switch at a first rate and to read these video signal at a second rate, thereby producing video channel signals at its output.

Such a channel memory module performs the above mentioned rate conversion and constitutes the most hardware intensive part of the system adaptor means. It is needed because the rate at which video signals are read from the video signal memories, henceforth called input transfer rate, differs in most cases from the rate at which the video signals, then also called video channel signals, are transferred over the communication system, the latter rate also being called output transfer rate.

Indeed, the input transfer rate is such that each block of a video signal is read at the optimal maximum retrieval rate of the video signal memory while different read operations are interspaced to yield an average output transfer rate equal to the average rate in the communication system. This way of retrieving the video signals allows reducing the number of video signal memories required in the video server to a minimum, as explained in more detail in the co-pending European patent application 93870085.3 corresponding to U.S. patent application Ser. No. 08/245,951 filed May 19, 1994. On the other hand, the output transfer rate is either equal to the above mentioned average rate, e.g. when the latter rate is the real-time transfer rate achieved for instance with Asynchronous Transfer Mode transmission, or it varies around this average rate in a way defined by payload and overhead datarates in e.g. a Synchronous Digital Hierarchy (SDH) trunk line. In both cases the rates are usually not equal and thus necessitate the use of channel memory modules to perform a rate conversion.

Yet a further characteristic feature of the present invention is that that each of said system adaptor means includes at least one trunk adaptor which is coupled to an output of a said channel memory module and whose output is coupled to said communication system, said trunk adaptor being able to convert said video channel signals to a format adapted to said communication system.

The trunk adaptors constitute that part of the system adaptor means which performs the above mentioned format conversion needed to be able to transmit the video signals over the communication system. Indeed, as already mentioned above, the communication system normally requires the video signals to have a specific format, e.g. as specified in the ATM or SONET standards, this format being rather difficult to be generated by the source of the video signals because of the overhead present therein. The provision of a set of system adaptor means and thus also a set of trunk adaptors is therefore very advantageous as the latter format cannot be generated as easily as the above switch format used by the broadband switch and hence tends to be more hardware expensive than the latter.

Still another characteristic feature of the present invention is that said channel memory module is connected to a further port of said broadband switch.

Thus the channel memory modules can be used as a pooled resource, i.e. as a resource available for rate conversion of any video signal routed thereto over the broadband switch, and serving the equipped set of trunk adaptors according to the traffic demand. Indeed, a variable number of channels proportional to the traffic demand can be assigned to each of the trunk adaptors.

Yet another characteristic feature of the invention is that the broadband switch is able to copy the video channel signals, and that the server control means is able to control the transfer of the copied video channel signals to distinct ones of the trunk adaptor means.

From the above first mentioned reference it can be seen that each of the video channels may be multicast to a plurality of terminals, thus reducing the over-all burden on the communication system. By proceeding in the above way, i.e. by passing the video channels a second time through the broadband switch after they have been converted to channel signals, this broadband switch can already perform part of this multicast thus reducing the amount of copies to be provided in further switches. Furthermore, by providing trunk adaptors at outputs of the switch their number may be determined by their use in view of the multicast probability in line with the principle of the present invention, i.e. the number of trunk adaptors required is determined by the demand of channel signals, i.e. the number of video signals, possibly to be supplied via the communication system.

Another characteristic feature of the invention is that the broadband switch forms part of the communications system.

Since the broadband switch can form part of the communication system, a multicast tree provided for one of the video channel signals is allowed to have branch points to distinct further switches. Thereby the cost of the present video server may be reduced in that only its components other than the broadband switch have to be purchased.

From the above first reference article it is clear that an important service category to be provided by a video server requires the transmission of a plurality of mutually delayed instances of a same video signal. Furthermore it may be appreciated from the latter article that improving the provided service entails a reduction in delay between the instances which also results in more stringent demands on the video memory technology.

Therefore, an important feature of the invention is that said channel memory modules are able to produce for each of said video signals a plurality of said video channel signals by reading delayed versions of said video signal at said second rate.

In so doing, the delay between successive instances of a same video signal may be refined by the channel memories by loading therein e.g. a video signal part which corresponds to that part of the video signal comprised between the starts of two successive coarse instances as already provided by the video memories, e.g. a video signal part of 5 minutes, and by then multiplying these coarse instances by reading each of the above video signal parts e.g. 5 successive times interspaced by 1 minute.

It may be verified that in this way video memories may be arranged so as to provide only a rather coarse mutual instance delay whereas the hardware needed to achieve a less coarse mutual instance delay may, in line with the principle of the present invention, be pooled among a large number of video signals unlikely to require simultaneously such a less coarse delay.

A further characteristic feature of the invention is that said server control means is adapted to be able to control the exchange of video signals between said video signal memories over said broadband switch.

In this way the availability of the video signals can be adapted in function of the demand, e.g. by transferring copies thereof from one video memory to one or more other video memories.

Another characteristic feature of the invention is that said server control means is adapted to be able to control transfer of said video signals from said video signal memories over said broadband switch directly to said communication system.

As a result video signals can be retrieved at a higher rate, since they are then transferred directly from the video signal memories to the communication system. This feature is for instance useful for the provision of functions such as fast rewind and fast forward.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
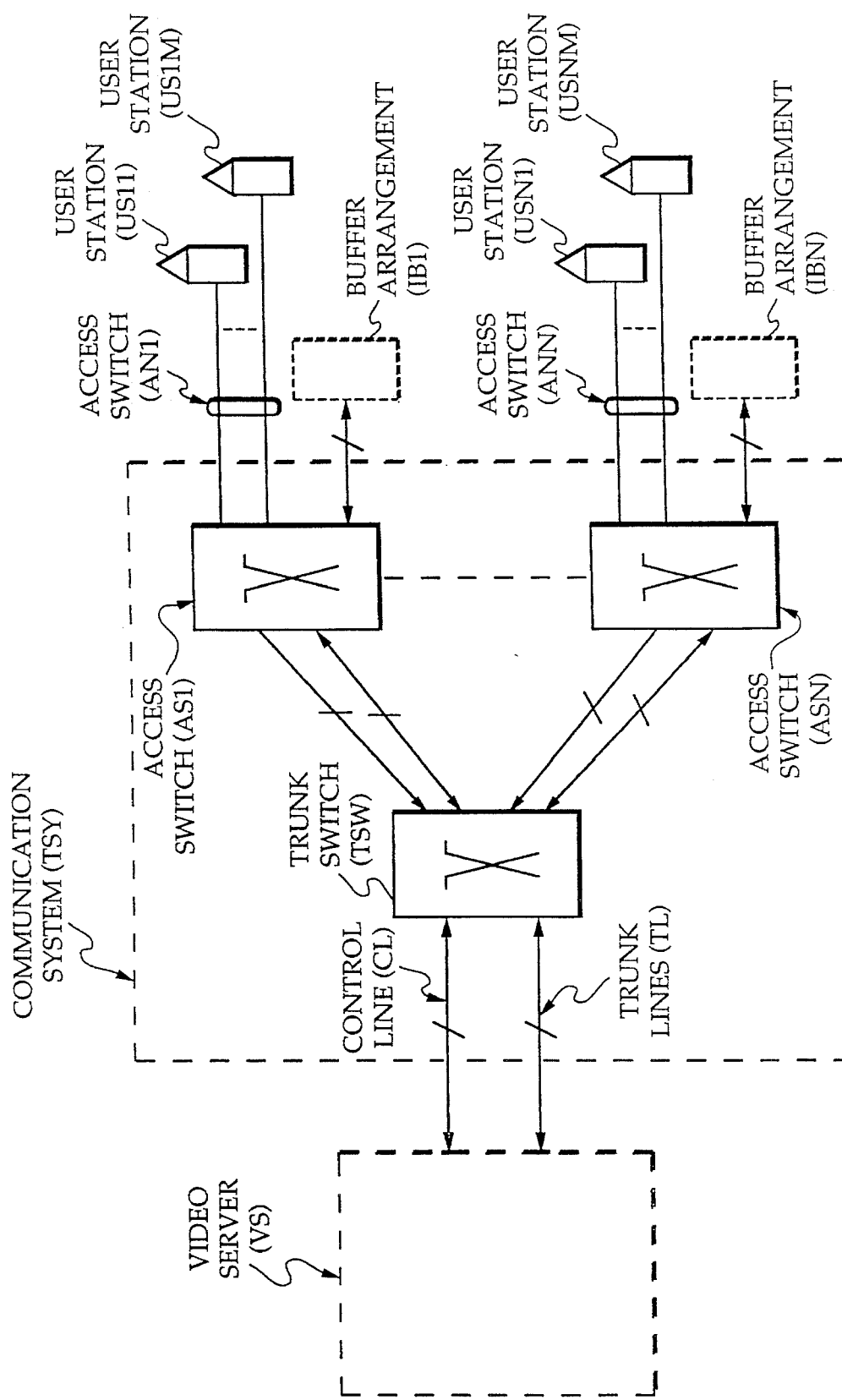
FIG. 1 represents a video on demand network using a video server VS according to the present invention.

The video on demand network shown in FIG. 1 includes a communication system TSY used to transfer versions of video signals from a video server VS, wherein these video signals are stored in read/write random access memories (not shown), to terminals of this communication system TSY to which buffer arrangements IB1, . . . , IBN and user stations US11, . . . , USNM are connected.

In the following, a video signal as stored in the video server VS is simply referred to as a video signal, whereas a video signal as transferred to a user station is referred to as a video signal version or a video signal instance, a same video signal being supplied as a plurality of versions or instances thereof. Resources made available to provide video signal versions are called video channels, while the video signal versions are also called video channel signals.

The general operation principles of this video on demand network with regard to the direct transfer of video signal versions, i.e. from the video server VS directly to the user stations US11, . . . , USNM are described in applicant's pending and not yet published European Patent applications 93870084.6 corresponding to U.S. Ser. No. 08/246,180, filed May 19, 1994 and 93870085.3 corresponding to U.S. patent application Ser. No. 08/245,951, filed May 19, 1994 while the general operation principles of the indirect transfer of video signal versions, i.e. via one of the buffers IB1, . . . , IBN and only thereafter to the user stations US11, . . . , USNM, are described in the applicant's European Patent application of even date entitled 'Interactive video on demand network' and corresponding to U.S. patent application Ser. No. 08/337,273, filed Nov. 10, 1994. Therefore these general operation principles are not discussed in more detail here and the above pending applications are incorporated herein by reference for background. Presently only the general architecture of the network is described to indicate how the video signals are transferred from the video server VS to the terminals.

The communications system TSY of FIG. 1 includes a trunk switch TSW having a first set of ports connected via trunk lines TL to respective ports of the video server VS, video signal versions being retrieved from VS and video signals being stored in VS via TL. TSW furthermore has a port connected via a control line CL to an interactive control port of the video server VS, interactive control signals being communicated to VS via CL.

The trunk switch is also coupled to access switches AS1 to ASN, via respective bidirectional trunk lines for transferring video signals and a number of control lines, from the access switches AS1 . . . ASN to the trunk switch TSW to transfer interactive control signals.

The access switches AS1 to ASN are coupled to the user stations US11, . . . , US1M to USN1, . . . , USNM via access lines AN1 to ANN respectively. These access lines are used to transfer video signals as well as interactive control signals as described in the above first mentioned pending U.S. patent application Ser. No. 08/246,180.

To be noted that AN1 to ANN could also be access networks and that the trunk switch TSW could be coupled to AS1 to ASN via intermediate switches or so-called cross-connects. The access switches AS1 to ASN are furthermore connected to the intermediate buffers IB1 to IBN, respectively, as described in the above mentioned U.S. co-pending patent application Ser. No. 08/337,273.

The communications system TSY may be any communication system able to carry video signals at at least real time speed based on any switching protocol, e.g. the Asynchronous Transfer Mode (ATM), the Synchronous Digital Hierarchy (SDH) or the Synchronous Optical Network (SONET) protocol, or it may be any mix of Broadband Integrated Services Digital Network (B-ISDN) transport and switching systems. Likewise, the access networks AN1 to ANN may for instance be Asynchronous Passive Optical Networks (APON) as described in the pending European patent application 91870197.0 corresponding to U.S. Ser. No. 07/983, 876 filed Dec. 1, 1992, Asynchronous Digital Subscriber Loop (ADSL) access networks or other arrangements.

Figure 2:
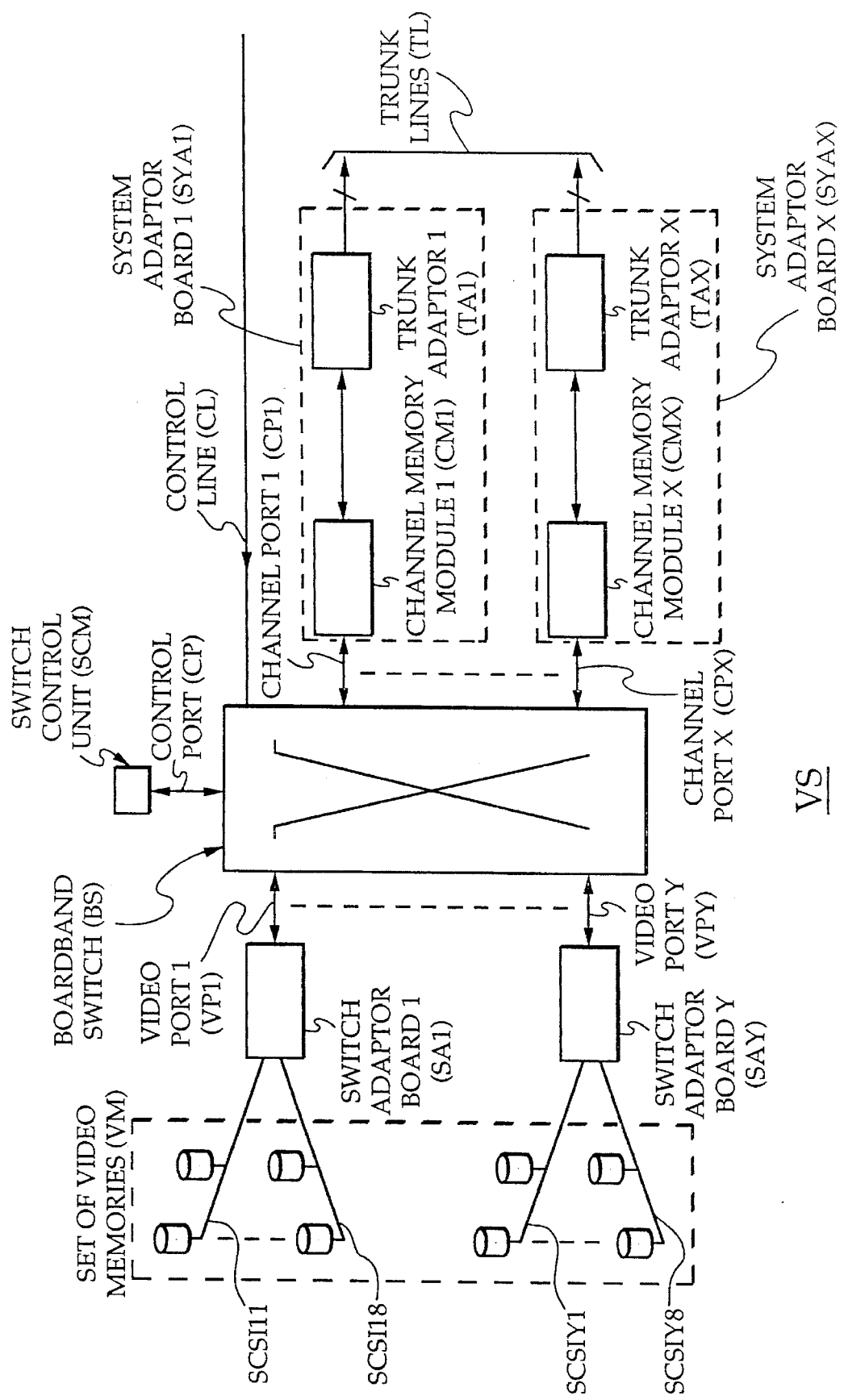
FIG. 2 shows a first embodiment of the video server VS of FIG. 1.

A first embodiment of the video server VS is shown in detail in FIG. 2. It includes a set VM of individual video memories connected to respective buses SCSI11 to SCSIY8 for instance according to the well known Small Computer Systems Interface standard SCSI-2 supporting a bitrate of maximum 80 Mbit/s.

To be noted that also other types of storage media could be used for the video memories VM.

The buses SCSI11 to SCSI18 are connected to switch adaptor boards SA1 to SAY respectively which are able to handle a maximum bitrate of 640 Mbit/s. In their turn the switch adaptor boards SA1 to SAY are connected to respective ones of the video ports VP1 to VPY of a broadband switch BS via a 655 Mbit/s line.

To be noted that these lines and buses are bidirectional ones so that not only video signal versions can be retrieved from the video memories VM but that also video signals can be stored therein as already described in the above mentioned first U.S. pending patent application Ser. No. 08/246,180. As a result, the ports VP1 to VPY have an input and an output part.

The switch adaptor boards SA1 to SAY are used to adapt the format of the video signals stored in the video memories to a format compatible with the broadband switch BS.

The broadband switch BS is controlled by a switch control unit SCM connected to its switch control port CP. A further port of BS is connected to the control line CL of FIG. 1 and constitutes the interactive control port of the video server VS. Channel ports CP1 to CPX of BS are coupled to respective ones of the trunk lines TL of FIG. 1 via respective system adaptor boards SYA1 to SYAX each constituted by the series connection of a channel memory module CM1/CMX and a trunk adaptor means TA1/TAX.

The broadband switch BS is a multi-path self-routing switch, for instance of the type disclosed in the article "Technology, distributed control and performance of a multipath self-routing switch", by M. A. Henrion et al., International Switching Symposium, October 1992, Yokohama, Vol. 2, pp. 2–6.

The structure of VS shown in FIG. 2 is similar to the one described in the above second mentioned pending U.S. patent application Ser. No. 08/245,951, except for the system adaptor boards SYA1 to SYAX which in the present video server VS are coupled to output ports of the switch BS, i.e. between BS and the communications system TSY, instead of between VM and BS. As a consequence, the general operation principles with regard to storage and retrieval of video signals and instances on and from the video memories VM are the same as in the latter pending application and are therefore not described in any detail here.

It is to be noted that the system adaptor boards SYA1 to SYAX are bidirectional line termination boards so that video signals can not only be read from, but also be stored in the video memories VM, as described in the above first mentioned pending U.S. patent application Ser. No. 08/246,180.

The way in which the video signals are stored in the video memories VM is not an object of the present invention and is therefore not described in detail. It may be realized in the way described for instance in the pending but not yet published European patent application 93870086.1 corresponding to U.S. patent application Ser. No. 08/246,182 or in the article "A system architecture for a large scale video on demand service", by W. Sincoskie, Computer Networks and ISDN Systems 22, 1991, pp. 155–162.

Figure 3:
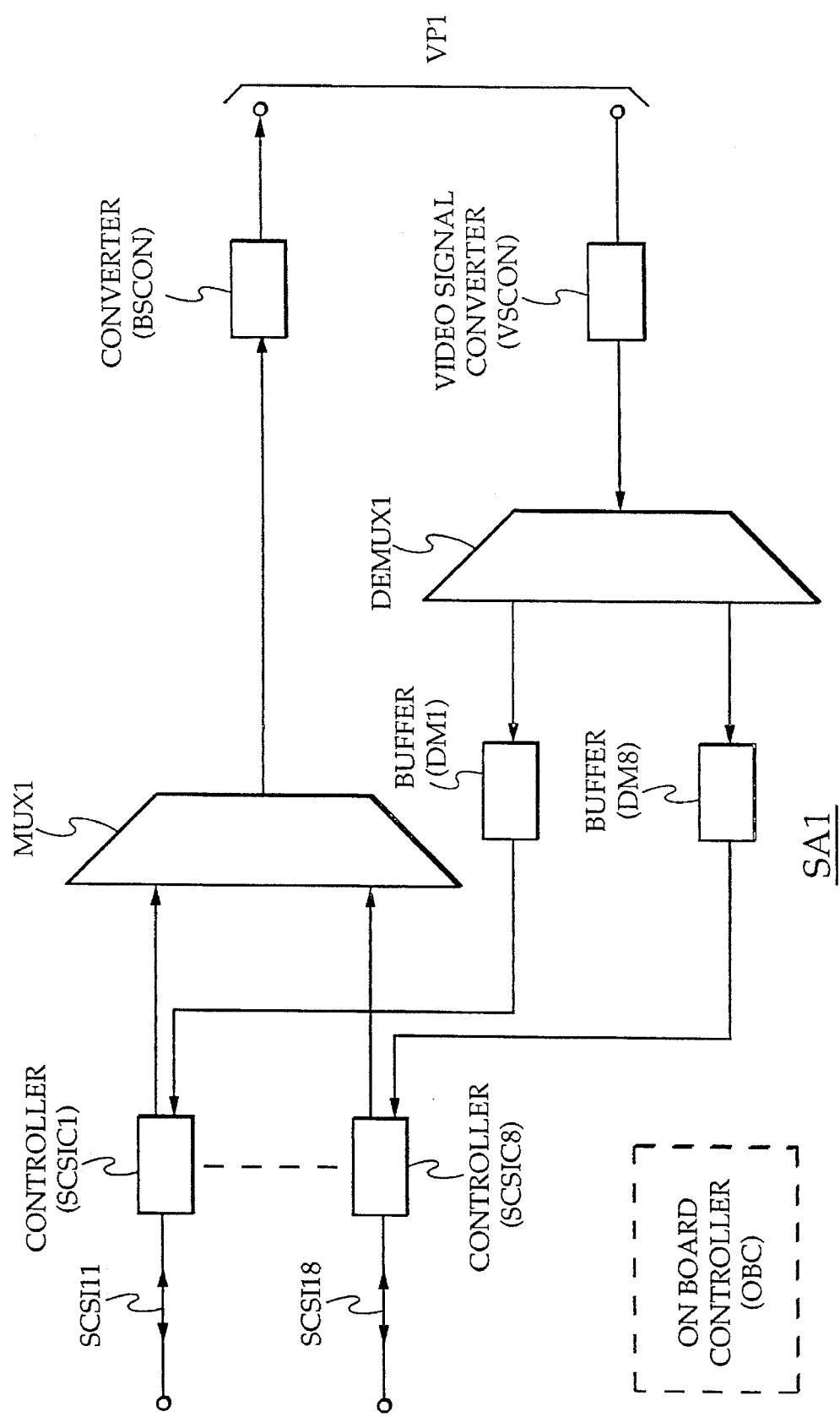
FIG. 3 shows the structure of the switch adaptation board SA1 of the video server VS of FIG. 2 in more detail.

One of the switch adaptor boards, i.e. SA1, is shown in detail in FIG. 3, the structure of the other boards being identical to that of SA1. The structure of this board is very similar to the one already described in the above second mentioned pending U.S. patent application Ser. No. 08/245,951.

SA1 includes controllers SCSIC1 to SCSIC8 which are connected to respective ones of the above buses SCSI11 to SCSI18 and an output of each of which is connected to a distinct input of a multiplexer MUX1 whose output is via a convertor BSCON coupled to the video port VP1 of the broadband switch BS. The output part of VP1 is coupled to an input of a demultiplexer DEMUX1 through a video signal convertor VSCON. Outputs of DEMUX1 are coupled to inputs of respective ones of the controllers SCSIC1 to SCSIC8 via respective buffers DM1 to DM8. An on board controller OBC controls the operation of SA1 and is thereto connected to the different blocks of SA1 via control lines which are not shown to avoid overloading the figure.

Figure 4:
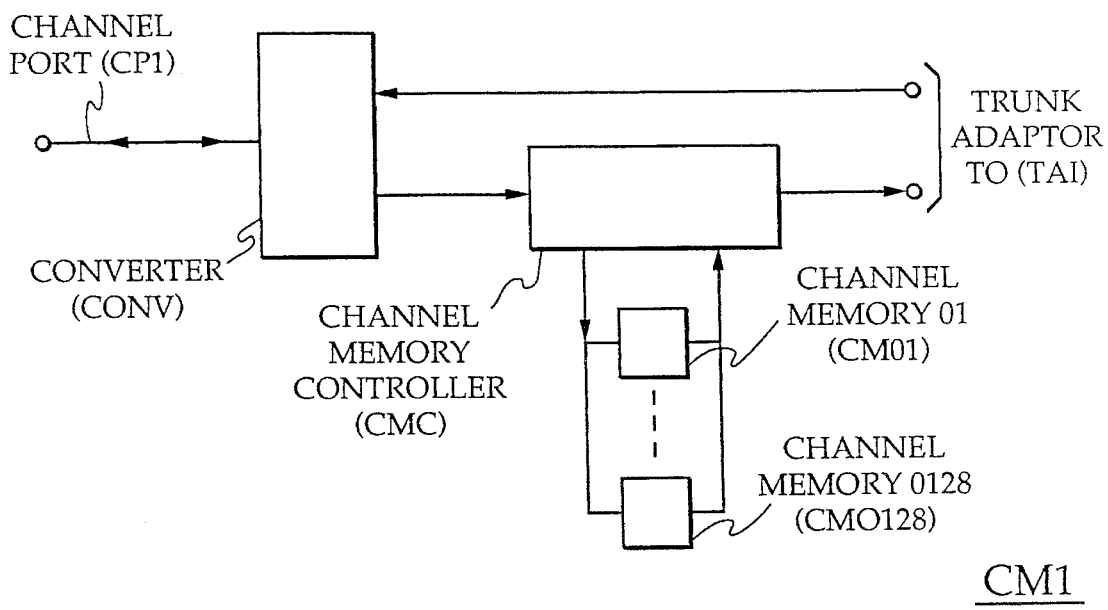
FIG. 4 shows the structure of the channel memory module CM1 of the video server VS of FIG. 2 in more detail.

The structure of the channel memory module CM1 is shown in FIG. 4, this structure being identical for all memory modules CM1 to CMx.

CM1 includes a convertor CONV with an input/output port connected to channel port CP1 of the broadband switch BS. Via a channel memory controller CMC an output of CONV is connected to a plurality of channel memories CM01 to CM0128 whose outputs are in their turn connected to an input of a corresponding trunk adaptor TA1 via the same channel memory controller CMC.

Figure 5:
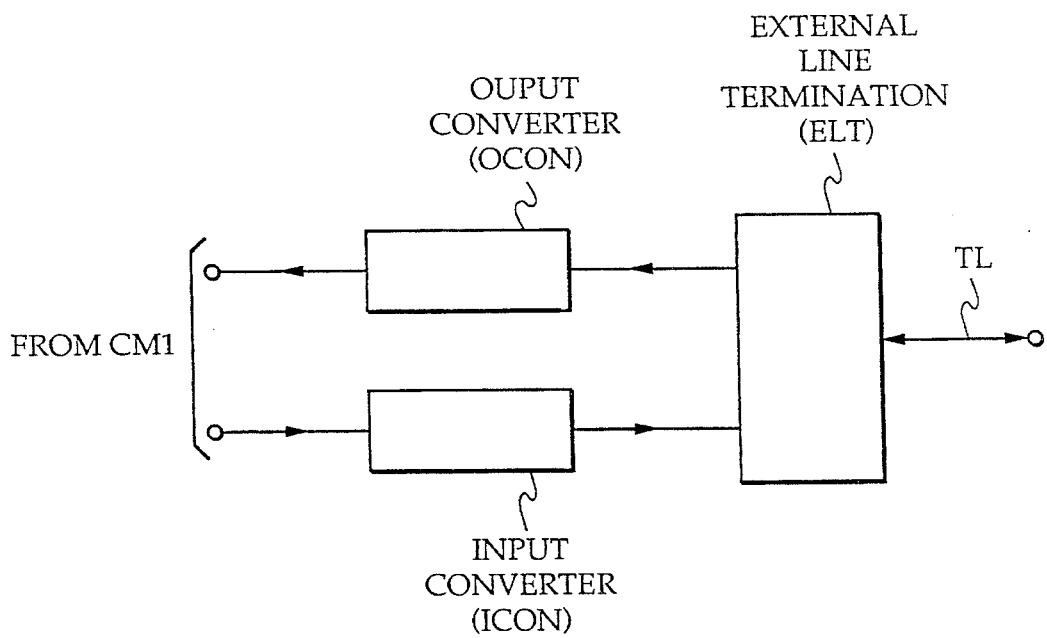
FIG. 5 shows the structure the trunk adaptor TA1 used in the video server VS of FIG. 2 in more detail; and, FIG. 6 shows a second embodiment of the video server VS of FIG. 1.

This trunk adaptor TA1 is shown in detail in FIG. 5 and includes an input convertor ICON connected between the input of TA1 and an input of an external line termination board ELT whose output is connected to an input of CONV (FIG. 4) via an output convertor OCON. A bidirectional port of ELT is connected to the trunk line TL.

Reference is now made to FIGS. 1 to 5 for a description of the operation of the above video on demand network.

When a user station, e.g. US11, issues a start-of-view request signal specifying that it wants to receive a specific video signal defined in this request signal, the latter request signal is applied to the video server VS via the access line AN1 (FIG. 1), the access switch AS1 and the switch TSW. In response VS then retrieves the requested video signal from VM (FIG. 2) in the way described in the above second mentioned pending patent application U.S. Ser. No. 08/245,951.

More particularly, SCM (FIG. 2) routes the request signal to for instance SA1 and the on-board controller OBC (FIG. 3) controls DEMUX1 to route the latter signal to the appropriate one of the controllers, for instance SCSIC1, to retrieve the requested video signal from the video memories VM via the corresponding bus, viz. SCSI11. The thus obtained video signal is in SA1 adapted, on the fly, to a format compatible with the switch BS. Because this switch BS is of the multi-path self-routing type, it is particularly well suited for such on the fly adaptation since the switch format adaption required by it merely consists in encapsulating successive parts of the video signal in separate cells to each of which a self-routing tag is appended. This allows the video signals to be transferred without a connection set-up procedure. Furthermore, no rate adaptation is needed since BS is able to operate at any video signal transfer rate.

In SA1 the video signal is more particularly applied to the convertor BSCON via MUX1 and in BSCON it is, together with a self-routing tag SRT, provided by the on board controller OBC, encapsulated on the fly in a so-called multi-slot-cell (MSC) format adapted to the broadband switch BS. To be noted that since no rate conversion is to be performed by the switch adaptor boards no buffers are required in the path from the buses SCSI11/SCSI18 to the video port VP1.

The video signal originating from the video memories VM is then switched by BS to one of the ports CP1 to CPX, e.g. CP1, from where it is applied to the corresponding one of the system adaptor boards SYA1 to SYAX, e.g. SYA1. Therein the channel memory module CM1 converts the rate of the video signals to a rate compatible with that of the communication system TSY, and the trunk adaptor TA1 converts the format of the video signals to a format compatible with that of TSY, i.e. to for instance an ATM, an SDH or a SONET format.

More particularly, when the retrieved video signal is applied to one of the system adaptor boards, e.g. SYA1, it is applied via CONV (FIG. 4) to the channel memory controller CMC of the channel memory module CM1. In the way described in the above second mentioned pending patent application Ser. No. 08/245,951 this video signal is arranged in blocks of for instance 256 kbytes each, each of these blocks being written in one of the channel memories CM01 to CM0128 at the same rate as with which it was applied to the switch adaptor board and with which it was switched through the broadband switch, i.e.e.g. at 80 Mbit/s.

To be noted that this rate is the rate at which the video signal is generated by cache buffers (not further discussed here) provided at the outputs of the the video memories VM and may thus be larger than the maximum transfer rate at which the video memories VM may be accessed, e.g. when the latter is a hard disk.

Under the control of a not shown pace control circuit these blocks are then read from the channel memories CM01 to CM0128, in the way already described in the last mentioned pending patent application, so that, at the output of the channel memory controller CMC, the video signal is provided at a rate compatible with the communication system TSY.

The video signal is then applied to the input convertor ICON (FIG. 5) of the corresponding trunk adaptor TA1 wherein it is converted to a format adapted to the communication system TSY, e.g. an SDH or SONET format. Via ELT and over TL it is then applied to TSY by which it is transferred to the user station US11 or to the buffer IB1, in the way described in the above mentioned co-pending U.S. patent application Ser. No. 08/337,273.

When a video signal e.g. from a not shown remote video server has to be stored in one of the video memories VM, it is applied to one of the system adaptor boards, e.g. SYA1 (FIG. 2) by the communication system TSY in the system format, e.g. an SDH format, and at the system rate. Via ELT (FIG. 5) it is then applied to the convertor OCON wherein its format is adapted to the MSC format compatible with the broadband switch BS. Via CONV of CM1 (FIG. 4) the video signal is then applied to BS by which it is switched directly, i.e. without passing through the channel memory modules, to the appropriate video port, e.g. VP1, in order to be stored in an appropriate one of the video memories VM.

The video signal having the above MSC format is then applied to the convertor VSCON of SA1 (FIG. 3) at the output part of the video port VP1 of the broadband switch BS. VSCON converts this format to a format adapted to the video memories VM and transfers it to the demultiplexer DEMUX1 which under the control of the on board controller OBC conveys the video signal in the thus obtained format to one of the controllers SCSIC11 to SCSIC18 via one of the buffers DM1 to DM8 and from there to the appropriate one of the video memories VM.

To be noted that the on board controller OBC keeps a list of which video signals are stored in which ones of the video memories VM.

To be also noted that video signals or versions thereof can also be passed from one of the video memories of VM to another one via BS. In this way copies of video signals can be passed from one video memory to another one to distribute the working load over the memories and the distribution of the video signals or of copies thereof can be dynamically adapted according to the number of request signals.

From the above it is clear that the number Y of switch adaptor boards SA1 to SAY is proportional to the number of video memories VM, i.e. to the number of video signals, e.g. films, stored therein, whereas the number X of system adaptor boards SYA1 to SYAX is proportional to the maximum number of video signals simultaneously deliverable. Obviously, X is substantially lower than Y as in a typical video server thousands of video signals can be stored whereas for instance at most a small percentage of the stored video signals is asked for simultaneously.

Figure 6:
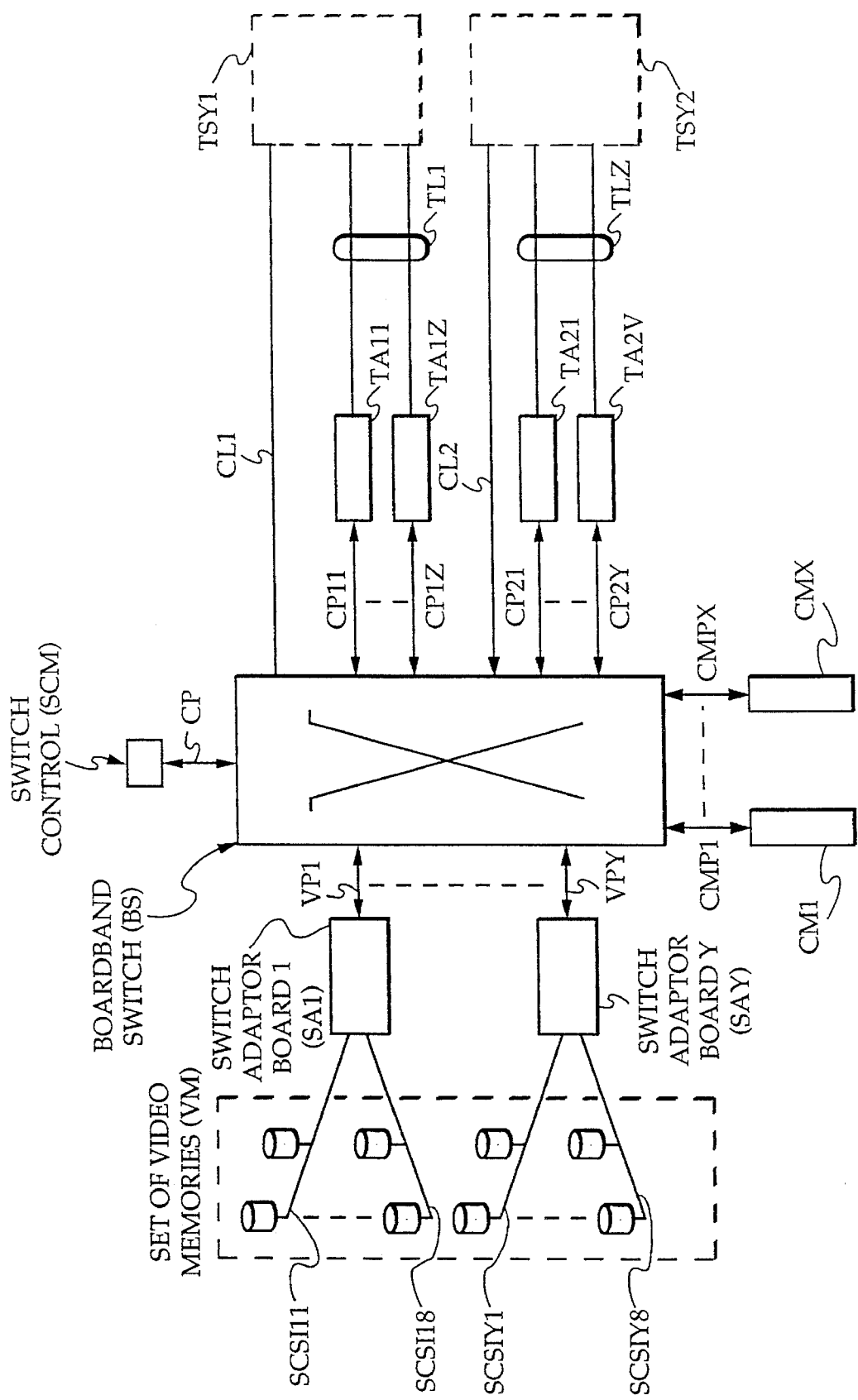

An alternative embodiment of the video server VS according to the present invention is shown in FIG. 6. Its structure is similar to that of FIG. 2, in that it includes video memories VM connected via respective buses SCSI11, . . . , SCSI18 to SCSIY1, . . . , SCSIY8 to respective switch adaptor modules SA1 to SAY and from there to respective video ports VP1 to VPY of a broadband switch BS and that the switch BS is controlled by a switch control unit SCM connected to a switch control port CP.

However, in this second embodiment channel memory modules CM1 to CMX are connected to BS via channel memory ports CMP1 to CMPX respectively and BS is coupled to distinct parts TSY1 and TSY2 of the communication system TSY, serving distinct sets of user stations. BS has a first set of bidirectional channel ports CP11 to CP1Z connected to TSY1 via respective trunk adaptors TA11 to TA1Z and trunk lines TL1, as well as an interactive control port to which an interactive control port of TSY1 is connected via a control line CL1. Likewise, BS has a second set of bidirectional channel ports CP21 to CP2V connected to TSY2 via respective trunk adaptors TA21 to TA2V and trunk lines TL2, as well as an interactive control port to which an interactive control port of TSY2 is connected via a control line CL2.

The operation of the above second embodiment of the video server is similar to the one already described in connection with the embodiment of FIG. 2, except for the fact that the video signal after having been switched to one of the channel memory modules CM1 to CMX is then switched to the appropriate one of the trunk adaptor boards which are in this second embodiment not directly coupled to the channel memory modules.

As a result the channel memory modules can be used as pooled resources and the video channel signals generated by these modules can be transferred over BS to predetermined ones of the trunk adaptor boards according to the traffic demand and of the destination user station.

Thus, a variable number of instances of the video signals with a variable inter-instance delay allocated as described in the applicant's European patent application 93870218.0 filed Nov. 17, 1993 and entitled 'Video on demand network' can be provided on each of the trunk lines TL1/TL2.

In both the embodiments of FIGS. 2 and 6 the channel memory modules CM1 to CMX may be used to increase the number of instances of a video signal provided by the video server VS as described hereafter, an instance being a delayed version of a video signal beginning at a predetermined moment of time. For a so-called quasi-video on demand service a number of such instances is provided with a constant mutual or inter-instance delay of e.g. 5 minutes. Any user station may thus start displaying an instance of the video signal within 5 minutes. However, as already described in the third above mentioned pending European patent application 93870086.1 corresponding to U.S. patent application Ser. No. 08/246,182, the number of instances available is limited by the maximum sustainable transfer rate of the video memories VM, which is e.g. about 20 Mbit/s for a hard disk, and by the way in which the video signal data are spread over the video memories VM. Obviously the inter-instance delay may be decreased by using faster memories, e.g. solid state memories instead of hard disks, and by providing more and smaller memories to store the video signals, both solutions substantially increasing the cost.

However, by using the channel memory modules in the following way, the inter-instance delay may be decreased from for instance 5 minutes to 1 minute.

When an instance is applied to one of the channel memory modules CM1 to CMX, e.g. to CM1, successive parts thereof are stored in 5 channel memories of CM1 each with a size corresponding to 1 minute, and this in a circular way.

To be noted that the size of the channel memories therefore has to be much larger than 256 kbytes (mentioned with respect to FIG. 4) and must for instance be equal to 120 Mbits (corresponding to 1 minute of a video signal at a display rate of 2 Mbit/s).

The first minute can upon being applied to the first channel memory be read therefrom substantially immediately, and while the second minute is being applied to the second channel memory, the first and second minutes can be read from the first and the second channel memories, respectively.

To be noted that when the sixth minute is applied to the first channel memory, the first minute of a next instance will again be applied to the channel memory module. Thus, consecutive instances mutually delayed over 1 minute are provided.

In the embodiment of FIG. 6 an instance provided by one of the channel memory modules can be provided to both TSY1 and TSY2 by copying it in the switch BS and by transferring a copy to each of the distinct parts TSY1 and TSY2.

To be noted that other embodiments can be realized by combining the features of the embodiments of FIGS. 2 and 6. For instance an embodiment can be realized similar to that of FIG. 2 but where the video channel memories are separated from the trunk adaptors and are connected to BS as in the embodiment of FIG. 6, or an embodiment can be provided similar to that of FIG. 6, but where the video channel memories and the trunk adaptors are connected as in the embodiment of FIG. 2.

To be noted also that SCM can control BS to transfer video signals directly from VM to TSY to for instance perform a fast transfer to IB1/IBN to provide for fast rewind and fast forward functions as described in the applicant's European patent application 93870216.4 filed Nov. 17, 1993 entitled 'Interactive video on demand network' and corresponding to U.S. patent application Ser. No. 08/337,273, filed Nov. 10, 1994.

While the principles of the invention have been described above in connection with specific apparatus, it is to be clearly understood that this description is made only by way of example and not as a limitation on the scope of the invention.

We claim:

1. Video server for use in a video on demand network wherein video signals are transferred over a communication system (TSY) from said video server to terminals of said communication system, said video server comprising:

video signal memories (VM);

a server control means (SCM);

a broadband switch (BS) having first ports (VP1/VPY) to which said memories (VM) are coupled; second ports (CL) coupled to said communication system (TSY) and a third port (CP) to which said server control means (SCM) is coupled, said server control means (SCM) controlling the transfer of said video signals from said memories (VM) and through said switch (BS) and communication system (TSY) to said terminals, wherein said broadband switch (BS) has a set of fourth ports (CP1/CPX) to which a set of system adaptor means (SYA1/SYAX) is coupled to adapt said video signals to a format which is compatible with said communication system, and wherein said server control means (SCM) performs said transfer of video signals firstly from said video memories (VM) to said system adaptor means (SYA1/SYAX) through said broadband switch (BS) and then from said adaptor means to said terminals via said communication system (TSY), wherein switch adaptor means (SA1/SAY) are coupled between outputs of said video memories (VM) and corresponding ones of said first ports (VP1/VPY) and are adapted to convert said video signals to a format which is compatible with said broadband switch (BS).

2. Video server according to claim 1, wherein said switch (BS) is of a multi-path self-routing type, and wherein said switch adaptor means (SA1/SAY) are adapted to convert said video signals on the fly.

3. Video server for use in a video on demand network wherein video signals are transferred over a communication system (TSY) from said video server to terminals of said communication system, said video server comprising:

video signal memories (VM);

a server control means (SCM);

a broadband switch (BS) having first ports (VP1/VPY) to which said memories (VM) are coupled; second ports (CL) coupled to said communication system (TSY) and a third port (CP) to which said server control means (SCM) is coupled, said server control means (SCM) controlling the transfer of said video signals from said memories (VM) and through said switch (BS) and communication system (TSY) to said terminals, wherein said broadband switch (BS) has a set of fourth ports (CP1/CPX) to which a set of system adaptor means (SYA1/SYAX) is coupled to adapt said video signals to a format which is compatible with said communication system, and wherein said server control means (SCM) performs said transfer of video signals firstly from said video memories (VM) to said system adaptor means (SYA1/SYAX) through said broadband switch (BS) and then from said adaptor means to said terminals via said communication system (TSY), wherein each of said system adaptor means (SYA1/SYAx) includes a channel memory module (CM1/CMx) able to store said video signals as supplied by said broadband switch (BS) at a first rate and to read these video signal at a second rate, thereby producing video channel signals at its output.

4. Video server according to claim 3, wherein each of said system adaptor means (SYA1/SYAX) includes at least one trunk adaptor (TA1/TAX) which is coupled to an output of a said channel memory module (CM1/CMX) and whose output is coupled to said communication system (TSY), said trunk adaptor being able to convert said video channel signals to a format adapted to said communication system.

5. Video server according to claim 4, wherein said channel memory module is connected to a further port of said broadband switch.

6. Video server according to claim 4, wherein said broadband switch (BS) is able to copy said video channel signals, and wherein said server control means (SCM) is able to control the transfer of said copied video channel signals to distinct ones of said trunk adaptor means (TA1/TAX).

7. Video server according to claim 4, wherein said broadband switch (BS) forms part of said communications system (TSY).

8. Video server according to claim 4, wherein said channel memory modules (CM1, ..., CMX) are able to produce for each of said video signals a plurality of said video channel signals by reading delayed versions of said video signal at said second rate.

9. Video server according to claim 4, wherein said server control means (SCM) is adapted for controlling transfer of said video signals from said video signal memories (VM) over said broadband switch directly to said communication system (TSY).

10. Video server according to claim 5, wherein that part of the communication network (TSY) to which the output of each of said distinct trunk adaptors, coupled to a same one of said channel memory modules, is coupled, is dedicated to said trunk adaptor.

11. Video server according to claim 5, wherein the output of said channel memory (CM1, ..., CMX) as well as the inputs of said trunk adaptors (TA11, ..., TA2V) are coupled to ports of said broadband switch (BS), said server control means (SCM) controlling the transfer of said video channel signals to distinct ones of said trunk adaptors via said broadband switch.

12. Video server according to claim 8, wherein the output of said channel memory (CM1, ..., CMX) as well as the inputs of said trunk adaptors (TA11, ..., TA2V) are coupled to ports of said broadband switch (BS), said server control means (SCM) controlling the transfer of said video channel signals to distinct ones of said trunk adaptors via said broadband switch.

* * * * *